United States Patent [19]

Gontowski, Jr.

[11] 4,247,847
[45] Jan. 27, 1981

[54] VIBRATION-DETECTING INTRUSION ALARM

[75] Inventor: Walter S. Gontowski, Jr., Thompson, Conn.

[73] Assignee: Sprague Electric Company, North Adams, Mass.

[21] Appl. No.: 934,154

[22] Filed: Aug. 16, 1978

[51] Int. Cl.³ .............................................. G08B 13/08
[52] U.S. Cl. ................................ 340/566; 200/61.48; 200/61.02; 307/117; 340/545
[58] Field of Search ............... 340/566, 556, 600, 545, 340/690, 540, 683; 307/117; 200/61.48, DIG. 8, DIG. 36, 61.02, 61.52

[56] References Cited

U.S. PATENT DOCUMENTS

| 3,709,030 | 1/1973 | Aselman, Jr. | 340/683 |
| 4,012,611 | 3/1977 | Petersen | 340/566 |
| 4,103,842 | 8/1978 | Martin et al. | 200/61.52 |

Primary Examiner—Glen R. Swann, III
Attorney, Agent, or Firm—Connolly and Hutz

[57] ABSTRACT

An opaque box encloses a lamp, an integrated circuit light-change detector including a photo-diode and an amplifier, and an opto-mechanical means for modulating the light that is coupled from the lamp to the photo-diode in response to a mechanical vibration of the box. This device serves as a vibration detector and more particularly as an intrusion alarm when mounted on a door or a window.

5 Claims, 3 Drawing Figures

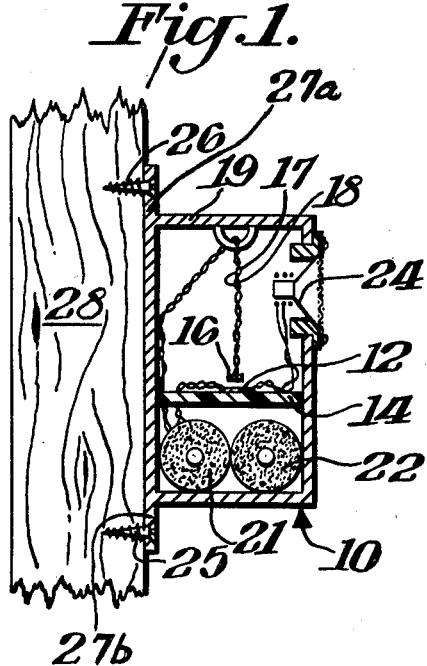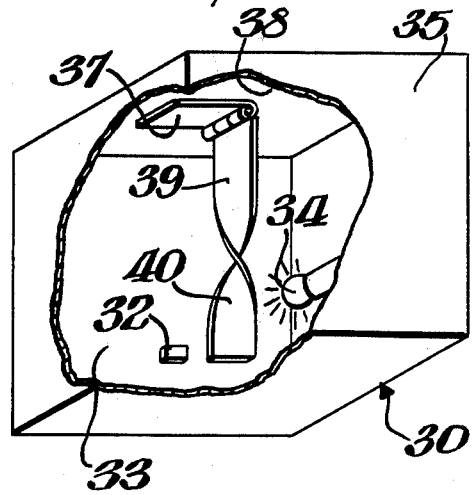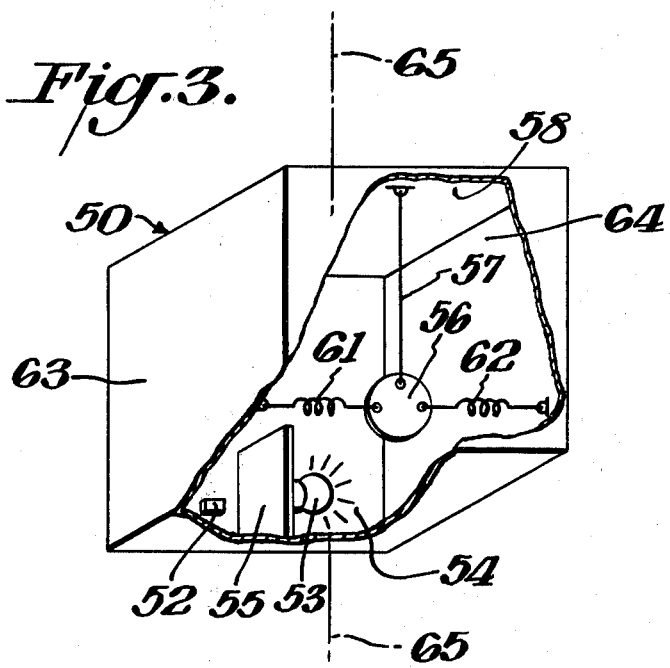

VIBRATION-DETECTING INTRUSION ALARM

BACKGROUND OF THE INVENTION

This invention relates to a vibration detector and more particularly to an enclosed device having a light-change detector and a light source that is modulated in response to mechanical vibration of the enclosure, and which enclosed device is suitable for use as an intrusion alarm.

An intrusion alarm system is described in my U.S. patent application Ser. No. 878,045, filed Feb. 15, 1978, which includes an integrated circuit photo-sensing chip that produces an alarm when the light being sensed is altered by a person, possibly an unwelcome intruder, moving about in the vicinity of the sensor. The alarm will be triggered on, either by an increase in the intensity of the sensed light as a result of its intensification by reflection from the person's light-colored clothing or by a decrease in the intensity of the sensed light as a result of the person having moved between the source of light and the sensor.

It is an object of the present invention to provide a vibration detector which produces an alarm signal when subjected to mechanical vibration exceeding a predetermined amplitude.

It is a further object of this invention to provide a vibration detector suitable for mounting on a door or a window for sounding an alarm when illicit entry through the window or door is attempted.

SUMMARY OF THE INVENTION

A vibration detector is comprised of an opaque enclosure wherein there is a light source, a light-change detector and alarm means and a vibration sensitive light coupling means. The light coupling means is connected to the enclosure for coupling the light from the light source to the detector means and for varying the intensity of the coupled light in response to mechanical vibrations that are experienced by the enclosure.

In one form of the invention, the light source is a low cost light emitting diode and the detector and alarm means is a low cost integrated circuit including a photo-diode and a photo-diode AC amplifier to generate an electrical alarm signal. The light coupling means may include a fixed mounting between the integrated circuit and the enclosure and a flexible mounting between the light emitting diode and the enclosure. One or more dry cell batteries may be included in the enclosure to provide electrical energy to the integrated circuit and to the light emitting diode. A speaker may be mounted in and become a part of a wall of the opaque enclosure and connected electrically to the output of the integrated circuit amplifier to transform the electrical alarm signal to an acoustic alarm signal. The enclosure may then be mounted by any convenient means to a door or a window to serve as a low cost intrusion alarm device.

BRIEF DESCRIPTION OF THE DRAWING

FIG. 1 shows in side sectional view a vibration detector of this invention being mounted to a door.

FIG. 2 shows in perspective view and partially broken away, another vibration detector of this invention.

FIG. 3 shows in perspective view and partially broken away, yet another vibration detector of this invention.

DESCRIPTION OF THE PREFERRED EMBODIMENT

In the sectional view of FIG. 1 a light tight metal box 10 has enclosed therei a light-change detector 12 that is fixedly mounted on an insulative shell 14 that is in turn mounted to the box 10. The detector 12 is an integrated silicon circuit including a silicon photo-diode and a photo-diode signal amplifier. This integrated circuit 12 is described in the aforementioned patent application Ser. No. 878,045 which is incorporated by reference herein.

The integrated circuit 12 is mounted so that the photo-diode faces upwardly as seen in FIG. 1. A light emitting diode (LED) 16 is suspended by two flexible individually insulated lead wires 17 and 18 from the top wall 19 of the box 10. Alternatively, the integrated circuit 12 may be suspended and the light emitting diode 16 fixedly mounted, providing an equivalent structure to that of FIG. 1. The detector 12 and the LED 16 are provided electrical energy by the two dry cell batteries 21 and 22. A miniature permanent magnet type speaker 24 is mounted in a side wall of the box 10 in such a manner that no light enters the interior chamber of the box 10 from the outside.

The box 10 has mounting flanges 27a and 27b by which the box is mounted by wood-screws 25 and 26 to the face of a wooden door 28 only a portion of which is shown. If the door 28 is moved or vibrated in a left or right direction, as shown, the suspended LED 16 tends to swing away initially from directly over the detector 12. Such movement causes a reduction in the intensity of light being detected by the detector 12. The detector 12 produces an alarm signal whenever the light being sensed is changed by about 5% or more. Once initiated, the alarm signal is latched on by means of a latching circuit for a predetermined period. This electrical alarm signal is connected through wires to the speaker 24 to produce an acoustic alarm signal. The batteries 21 and 22 also power the integrated circuit 12.

The vibration detector of FIG. 2 includes an opaque box 30, having a light-change detector 32 fixedly mounted on the interior face of the rear wall 33 of box 30, and an incandescent lamp 34 fixedly mounted on the interior of the front wall 35. A metal hinge has one metal hinge plate 37 fixedly mounted to the top wall portion 38 of box 30 while the other metal hinge plate 39, hangs downwardly. The plate 37 has its lower end portion 40 twisted at right angles to its hinged upper end portion. The lower end portion 40, in the still position, serves as a light blocking body or vane. When the box 30 is subjected to vibration in the left and right directions, the vane 40 vibrates and alternately changes the intensity of the light from lamp 34 which impinges upon the detector 32, and an alarm signal is generated by the integrated circuit detector 32.

An opaque box 50, as shown in FIG. 3 has a light-change detector 52 and an incandescent lamp 53 fixedly mounted on the interior of the rear wall 54. An opaque shield plate 55 is mounted between detector 52 and lamp 53 to prevent direct light radiation from the lamp 53 from falling upon the detector 52. A reflective body, namely a mirror 56, is suspended by a flexible wire 57 from the top wall 58 of the box 50. Springs 61 and 62 are connected between the mirror 56 and the left wall 63 and between the mirror 56 and the right wall 64, respectively, to keep the mirror 56 oriented so that light from the lamp 53 is reflected onto the detector 52.

In the embodiment of FIG. 3, vibration of the box 50 in a rotational mode about vertical axis 55 causes the mirror to oscillate rotationally about an axis coincident with the wire 57. Linear vibration of the box 50 from left to right will move the mirror 56 from left to right, also varying the light falling on the detector 32, and setting off the alarm.

In the embodiments illustrated in FIGS. 2 and 3, the electrical wiring is omitted to more clearly show the physical arrangement of the major components. The electrical power source (also not shown) may be located exterior to the box, as may the speaker or other signal transducer device. Although only three embodiments are illustrated, there are many posible variations of these structures whereby mechanical vibrations imparted to the box may be converted to an optical signal and thence to an electrical alarm signal in accordance with the principles of this invention.

What is claimed is:

1. An integral vibration-detecting intrusion alarm for mounting on a door or a window to sound an alarm when an attempt is made to open said door or window comprising:
    (a) an opaque enclosure for preventing the admission of light from outside of said enclosure into the interior chamber thereof;
    (b) an electrically powered light source within said enclosure;
    (c) a light change detector means being within said enclosure for detecting change in the incident light from said light source and for providing an output signal when said light change exceeds a predetermined percentage of the normal ambient light level existing prior to a vibration, said detector means being comprised of an integrated silicon circuit having a photo-diode and a noise immune voltage regulator circuit that is connected to said photo-diode for providing essentially noise free DC voltage thereto;
    (d) an acoustic alarm generator being electrically connected to the output of said detector means and being mounted to said enclosure;
    (e) a vibration sensitive light coupling means being connected to said enclosure for coupling the light from said light source to said light-change detector means and for varying the intensity of said coupled light in response to mechanical vibrations experienced by said enclosure;
    (f) an energy storage means being attached to said enclosure for supplying electrical energy to said light source, said detector means and said alarm generator; and
    (g) an enclosure mounting means for attaching said enclosure to a barrier by which an entry may be closed, such as said window or door.

2. The intrusion alarm of claim 1 wherein said light coupling means consists of a fixed mounting between said enclosure and said light-change means, and a flexible mounting between said enclosure and said light source.

3. The intrusion alarm of claim 2 wherein said light source is hingedly suspended from an upper portion of said enclosure.

4. The intrusion alarm of claim 1 wherein said light coupling means consists of a fixed mounting between said enclosure and said light source, a fixed mounting between said enclosure and said light-change detector means and a light-attenuating body being flexibly mounted to said enclosure and being movable to an intermediate position between said light source and said light-change detector means.

5. The intrusion alarm of claim 1 wherein said light coupling means consists of a fixed mounting between said enclosure and said light source, a fixed mounting between said enclosure and said light-change detector, and a light reflective body being flexibly mounted to said enclosure and in one position, being adapted to couple said light from said source to said light-change detector.

* * * * *

UNITED STATES PATENT OFFICE
CERTIFICATE OF CORRECTION

Patent No. 4,247,847         Dated January 27, 1981

Inventor(s) Walter S. Gontowski, Jr.

It is certified that error appears in the above-identified patent and that said Letters Patent are hereby corrected as shown below:

Column 2, line 5, "therei" should read -- therein --
Claim 2, line 3 (Column 4, line 19), after "light-change" insert -- detector --

Signed and Sealed this

Fourteenth Day of April 1981

[SEAL]

Attest:

RENE D. TEGTMEYER

Attesting Officer     Acting Commissioner of Patents and Trademarks